United States Patent [19]
Basavanhally

[11] Patent Number: 6,052,880
[45] Date of Patent: Apr. 25, 2000

[54] OPTICAL FIBER STRIPPING APPARATUS

[75] Inventor: Nagesh R. Basavanhally, Mercerville, N.J.

[73] Assignee: Lucent Technologies Inc., Murray Hill, N.J.

[21] Appl. No.: 09/012,282

[22] Filed: Jan. 23, 1998

[51] Int. Cl.⁷ .................................................. B23P 23/04
[52] U.S. Cl. ................................ 29/33.5; 29/825; 81/9.51
[58] Field of Search ........................ 29/33.5, 825; 81/9.51

[56] References Cited

U.S. PATENT DOCUMENTS 2,774,130  12/1956  Folkenroth .
4,993,287   2/1991  Carpenter et al. ..................... 81/9.51

*Primary Examiner*—P. W. Echols
*Assistant Examiner*—John C. Hong

[57] ABSTRACT

Apparatus for removing a length of outer protective layer from the end of an optical fiber. The apparatus accurately locates the fiber at a cutting station, engages a pair of opposed blades to cut the outer layer, and utilizes a constant force to remove the length of outer layer from the fiber.

12 Claims, 4 Drawing Sheets

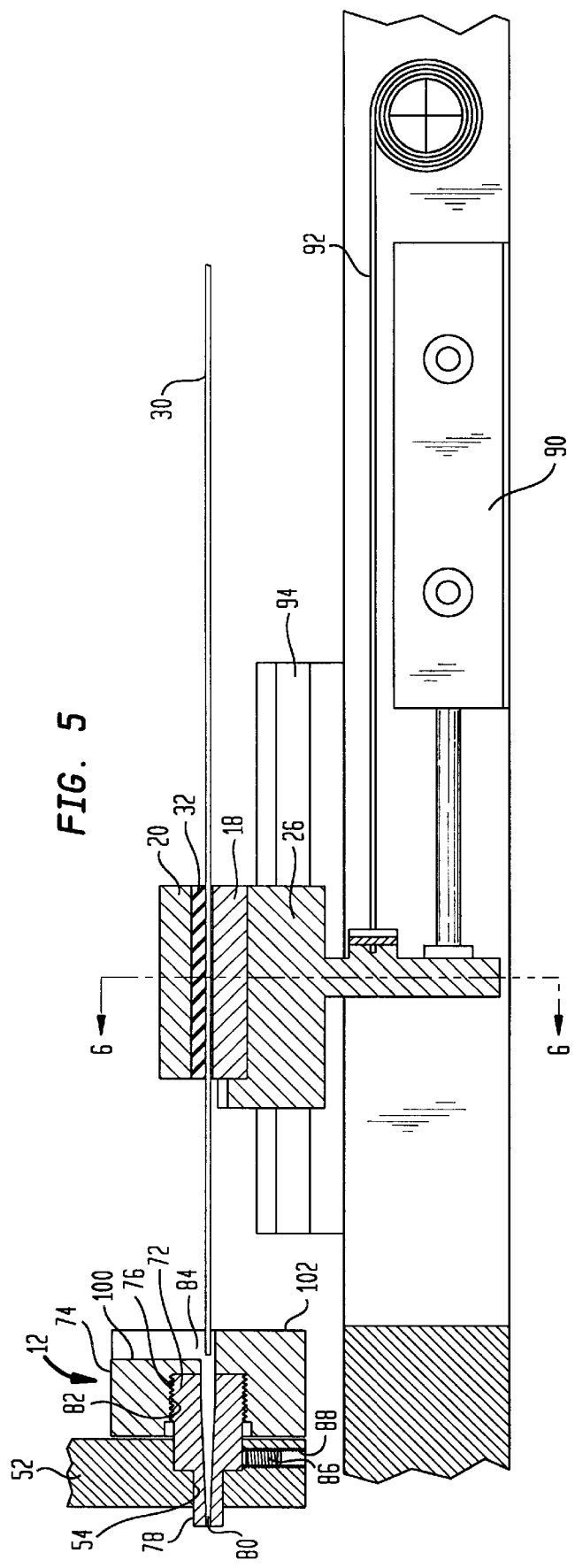

OPTICAL FIBER STRIPPING APPARATUS

BACKGROUND OF THE INVENTION

This invention relates to the processing of optical fibers and, more particularly, to apparatus for baring an end of a sheathed optical fiber.

Individual optical fibers are typically provided with a protective outer sheath. Such a sheath may have one or more layers. Thus, a typical optical fiber has a diameter of approximately five mils and is covered with a polymer layer (the primary coating) with an overall diameter of approximately ten mils. The primary coating may optionally be covered by a polymer secondary coating with an overall diameter in the range from about thirty-five mils to about one hundred mils. For the sheathed fiber to be secured to a connector or to be spliced to another fiber, a length of the fiber adjacent an end must be bared by removing the coating(s) over that length.

When stripping the coatings from an optical fiber protected by two layers of polymer, this is done as a two-step procedure. In the first step, a length of the secondary coating is removed to expose the primary coating. This is done by cutting through the secondary coating to separate the unwanted length of the secondary coating from the rest of the secondary coating and then pulling the unwanted length of the secondary coating off the primary coating. Then, a shorter length of the exposed primary coating is removed in a similar manner. Until now, such baring of an end of an optical fiber has been done manually, using commercially available handheld stripping tools which apply heat for softening the coating to be removed. This manual operation introduces operator variability, which reduces the yield. This variability includes the length of time the heat is applied and the pull force applied to the removed length of coating. Further, the resulting bare fiber typically has traces of the removed primary coating on its surface, which requires a cleaning operation. In addition, the removed lengths of coating have to be removed from the stripping tool. It would therefore be desirable to provide an optical fiber stripping apparatus which eliminates operator variability, cleans the fiber, removes unwanted debris and is adaptable to be automated.

SUMMARY OF THE INVENTION

According to the present invention, there is provided apparatus for removing a length of an outer protective layer from an end of an optical fiber. The apparatus comprises a retainer, a cutter, and first and second actuators. The retainer is movable by the first actuator reciprocably along a line and is arranged to firmly hold the fiber and its outer protective layer beyond the length from the end, with the longitudinal, axis of the fiber lying parallel to the line. The cutter includes a pair of blades. The blades are generally planar and both lie in a plane orthogonal to the line. The pair of blades are movable in the plane by the second actuator toward and away from each other. Each of the pair of blades has a concave semi-circular cutting edge aligned so that when the one blade is moved into contact with the other blade there is formed a circular opening defined by the pair of concave semi-circular cutting edges. The circular opening has a diameter substantially equal to the inner diameter of the outer protective layer and is centered on the longitudinal axis of the fiber when the fiber is held by the retainer. Accordingly, when a fiber is held by the retainer, the first actuator moves the retainer in a first direction so that the end of the fiber passes beyond the pair of blades by a distance equal to the length that is to be removed. The second actuator is then effective to move the pair of blades into contact with each other so that the pair of cutting edges cut through the outer protective layer of the fiber. Finally, the first actuator is effective to move the retainer in a second direction opposite the first direction so that the length of outer protective layer is removed from the fiber.

In accordance with an aspect of this invention, the apparatus further includes a heater adjacent the cutter and on the side of the cutter opposite the retainer. The heater has an elongated cavity for receiving and heating the length of the outer protective layer.

In accordance with another aspect of this invention, the first actuator includes a constant force spring coupled to the retainer to move the retainer in the second direction away from the cutter. Accordingly, a constant force is used for removing the length of outer protective layer from the fiber.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 5 is a longitudinal cross sectional view showing an embodiment of apparatus schematically shown in FIG. 1.

DETAILED DESCRIPTION

Figure 1:
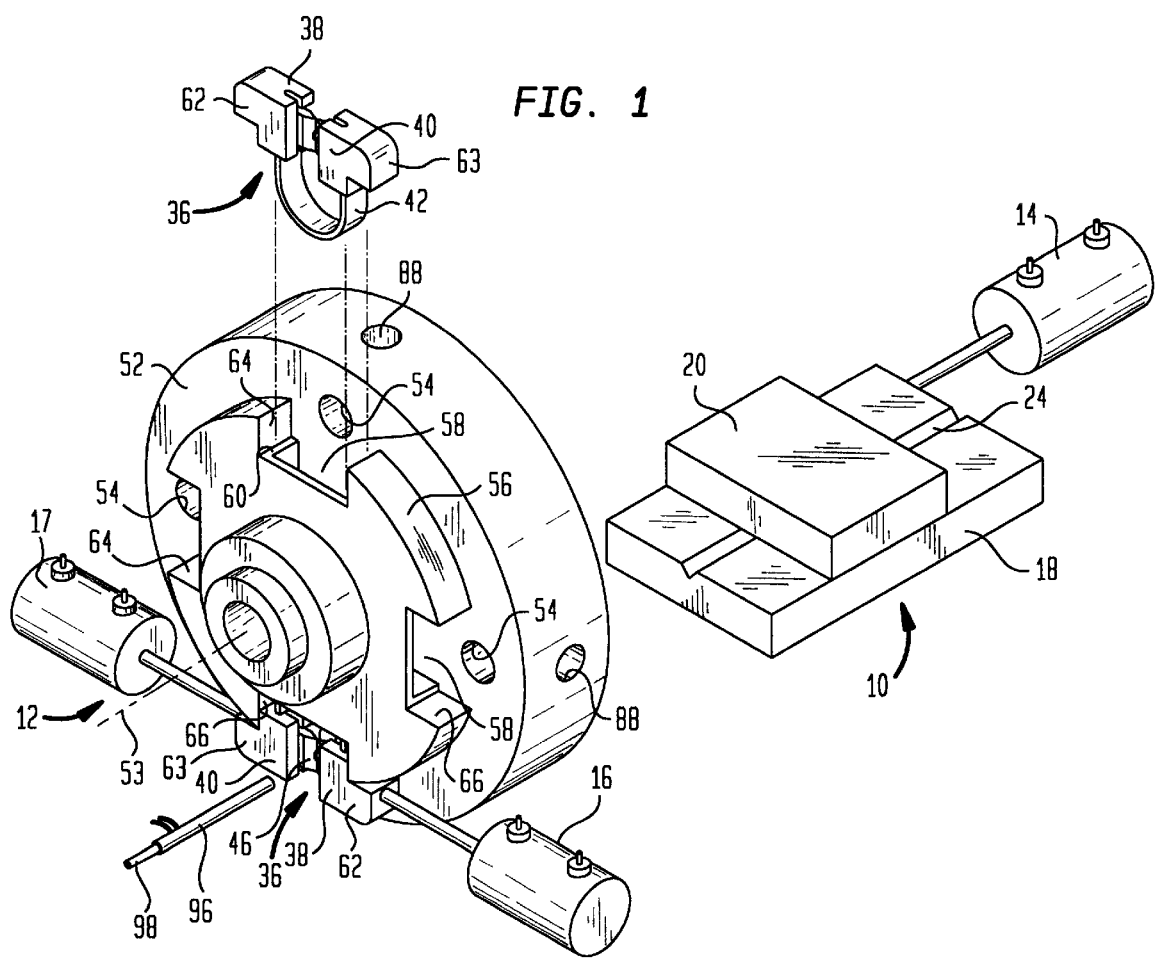
FIG. 1 is a perspective view, with a pair of blades partially exploded away, schematically showing apparatus constructed in accordance with the principles of this invention.

Referring to the drawings, FIG. 1 schematically depicts the inventive apparatus which includes a retainer assembly, designated generally by the reference numeral 10, a cutter assembly, designated generally by the reference numeral 12, a first actuator 14 for moving the retainer assembly 10, and second actuators 16, 17 for moving blades of the cutter assembly 12. The function of the retainer assembly 10 is to firmly hold a fiber being processed with the longitudinal axis of the fiber lying parallel to a line along which the retainer assembly 10 is movable reciprocably by the actuator 14. The cutter assembly 12 includes a pair of blades which are movable toward each other by the actuators 16, 17 to cut through the outer protective layer of the fiber being processed. Thus, a fiber is placed in the retainer assembly 10, the actuator 14 moves the retainer assembly 10 toward the cutter assembly 12, the actuators 16, 17 move the blades to cut through the outer protective layer of the fiber, and the retainer assembly 10 is moved away from the cutter assembly 12 to strip the distal length of outer protective layer from the optical fiber, as will be described in full detail hereinafter.

Figure 2:
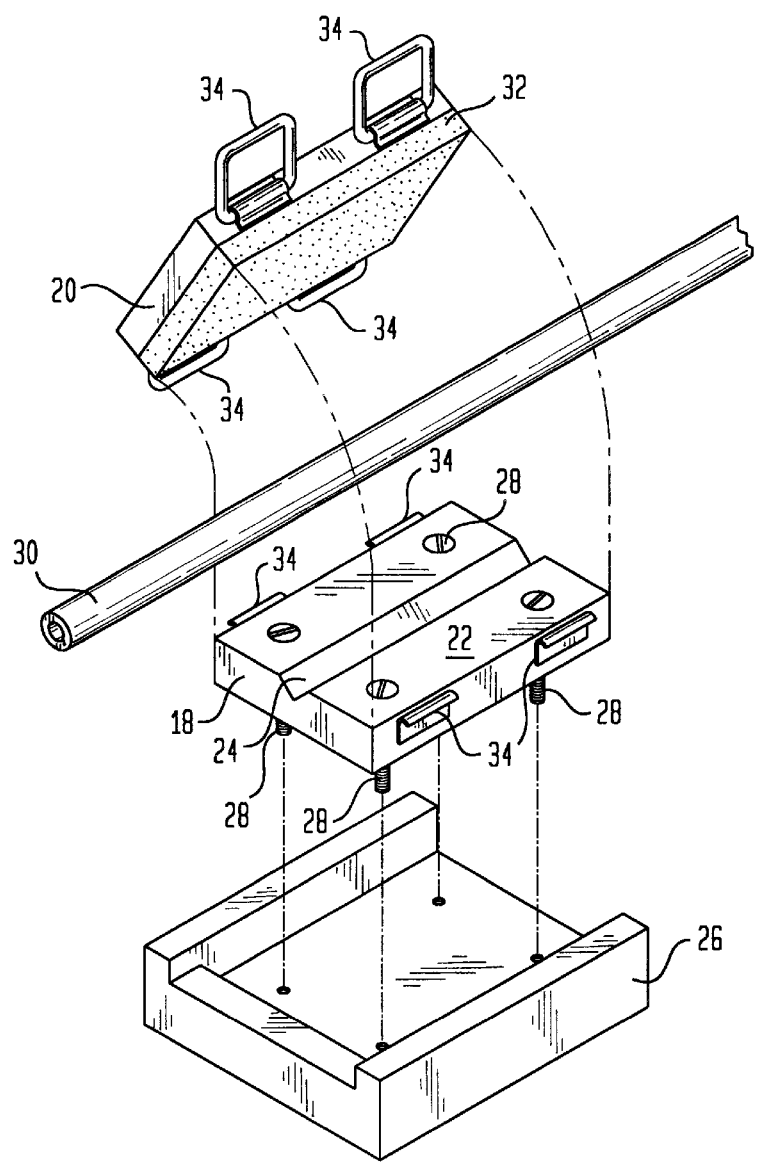
FIG. 2 is an exploded perspective view of a fiber retainer assembly for use with the apparatus shown in FIG. 1.
Figure 6:
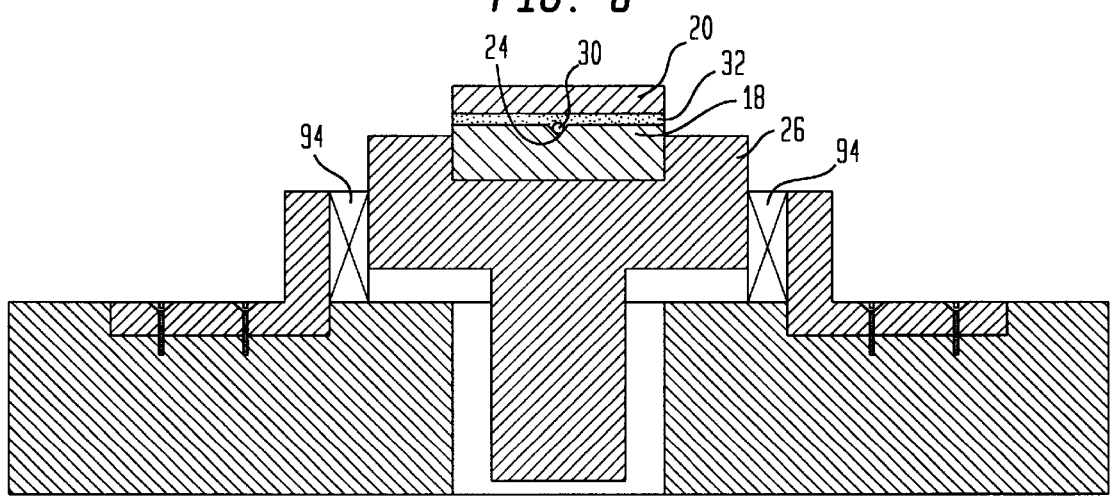
FIG. 6 is a cross sectional view taken along the line 6—6 in FIG. 5.

As shown in FIG. 2, the retainer assembly 10 includes a base 18 and a cover 20. The base 18 has a generally planar upper support surface 22 in which there is formed an elongated straight V-shaped groove 24. The base 18 is secured to a slider 26 by screws 28 or the like. As will be described, the slider 26 is movable reciprocably along a line and the groove 24 is parallel to that line. The groove 24 is preferably V-shaped so that a fiber 30 placed therein is prevented from moving laterally. The depth of the groove 24 is such that when the fiber 30 is bottomed in the groove 24, part of the fiber 30 extends above the surface 22. The cover 20 has a layer 32 formed of a compliant material. The compliant layer 32 extends across the groove 24 and when the cover 20 is secured to the base 18, by latches 34 or the like, the layer 32 engages the support surface 22 and the fiber 30 received in the groove 24.

The cutter assembly 12 includes at least one blade subassembly 36. The blade subassembly 36 has a pair of blade holder blocks 38, 40 each secured to a respective end of a U-shaped leaf spring 42 which biases the blocks 38, 40 away from each other. Each of the blocks 38, 40 holds a respective cutting blade 44, 46, which has a respective exposed concave semi-circular cutting edge 48, 50. The blades 44, 46 are generally planar and both lie in the same plane. The cutting edges 48, 50 are aligned so that when the blades 44, 46 are moved into contact with each other, there is formed a circular opening defined by the pair of concave semi-circular cutting edges 48, 50. The diameter of this circular opening is substantially equal to the inner diameter of the outer protective layer of the fiber to be stripped by the blade subassembly 36. Accordingly, for each size fiber, there is provided an appropriately sized blade subassembly 36.

The cutter assembly 12 is preferably arranged to hold a plurality of blade subassemblies 36 so that a plurality of different sized fibers can be accommodated. Accordingly, the cutter assembly 12 includes a cutter holder block 52 which is preferably cylindrical in shape and arranged to be rotatable about the central axis 53 of the cylinder, which is parallel to the line along which the slider 26 of the retainer assembly 10 is movable. The block 52 is formed with a plurality of bores 54 therethrough which are parallel to the axis 53. A cutter receiving member 56 is secured to the block 52 on the side opposite the retainer assembly 10. The cutter receiving member 56 is formed with a plurality of cavities 58 each associated with a respective one of the bores 54 and each for holding one of the blade subassemblies 36. As shown in FIG. 1, each blade subassembly 36 is inserted spring 42 first into a respective cavity 58, with the blocks 38, 40 resting on the ledge 60 surrounding the cavity 58. The blocks 38, 40 each includes an extension 62, 63 which extends out of the periphery of the cutter receiving member 56 and is used for engagement by the actuators 16, 17, respectively. The spring 42 functions to bias the block 38 against the wall 64 and to bias the block 40 against the wall 66.

Figure 1A:
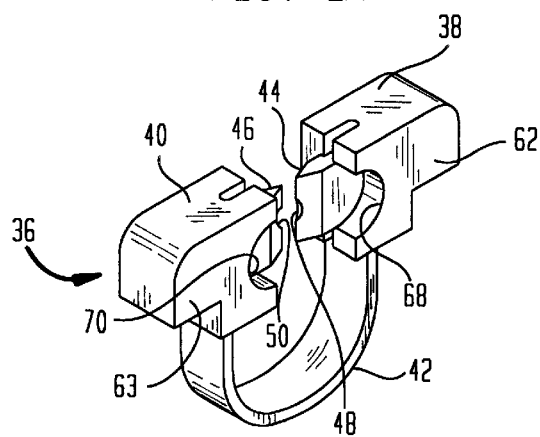
FIG. 1A is a perspective view showing the side of the pair of blades not visible in FIG. 1.

As shown in FIG. 1A, each of the blocks 38, 40 is formed with a respective recess 68, 70 on the side facing the cutter holder block 52. Each recess 68, 70 is defined by an arcuate wall which is concentric with a respective semi-circular cutting edge 48, 50 and is of equal radius with the other recess arcuate wall. When the blade subassembly 36 is inserted into the respective cavity 58, the recess 70 is aligned with the respective bore 54, which is of equal diametric dimension. When the blade holder block 38 is moved toward the blade holder block 40 so that the cutting edges 48, 50 form a circular opening, the recess 68 is also aligned with the bore 54. Accordingly, the recesses 68, 70 are utilized for aligning the cutting edges 48, 50 with the fiber, as will be described.

Figure 3:
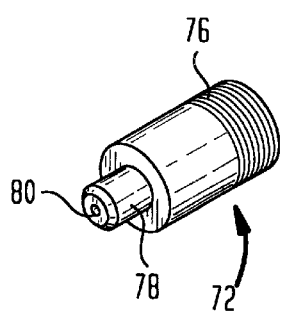
FIG. 3 is a perspective view of a fiber locator for use with the apparatus shown in FIG. 1.
Figure 4:
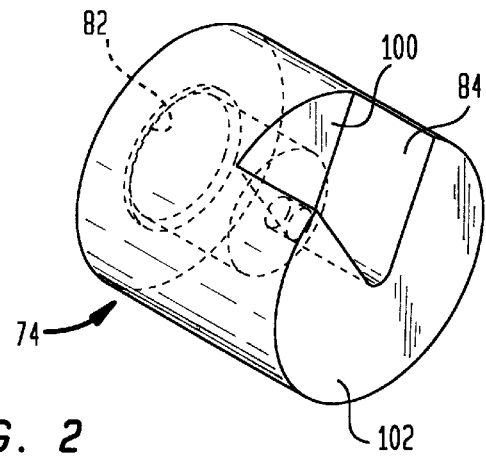
FIG. 4 is a perspective view of a stop for use with the apparatus shown in FIG. 1.

To assist in ensuring such alignment, there is provided a fiber locator 72 (FIG. 3) and a stop 74 (FIG. 4). As shown, the fiber locator 72 is formed as a stepped cylindrical member, with the larger cylindrical portion having threads 76 formed at one end. The smaller cylindrical tip 78 has a radius substantially equal to the radius of the radii of the arcuate walls defining the recesses 68, 70 of the blocks 38, 40 of the blade subassembly 36. As shown in FIG. 5, the fiber locator 72 is formed with a central longitudinal circular bore 80 which tapers inwardly from an enlarged region near the threaded end of the fiber locator 72 to a smaller region passing through the cylindrical tip 78, the diameter of the smaller region of the bore 80 being sufficient to allow a fiber with its outer protective layer to pass therethrough with minimum clearance. Since the inventive apparatus has been designed to accommodate different size fibers, fiber locators with different internal bore dimensions are made available.

The stop 74 is also preferably generally cylindrical in shape and is formed with a central longitudinal bore 82 with an enlarged region and a stepped down smaller region sized the same as the enlarged region of the bore 80 of the fiber locator 72, as best shown in FIG. 5. The enlarged region of the bore 82 is of the same size as the enlarged portion of the fiber locator 72 and is formed with internal threads for matingly engaging the threads 76 of the fiber locator 72. Thus, the fiber locator 72 is secured to the stop 74 by threading the fiber locator 72 into the stop 74. The stop 74 is further formed with a fiber guide channel 84 which is generally V-shaped with its bottom coextensive with the smaller region of the bore 82. Since it is desired to be able to strip different lengths of outer protective layer from a fiber, the fiber stop 74 is available in different overall lengths, with the length of the fiber guide channel 84 always remaining the same.

After the fiber locator 72 and the stop 74 are threadingly secured together, the combined subassembly is installed in a bore 54 of the cutter holder block 52. As shown in FIG. 5, the bore 54 is stepped to accommodate the stepped fiber locator 72 with the cylindrical tip 78 extending outwardly from the bore 54. A set screw 86 inserted into a threaded bore 88 is used to retain the combined fiber locator 72 and stop 74 in position.

As shown in FIG. 5, the slider 26 is coupled to the piston of an air cylinder 90, which is part of the actuator 14. The air cylinder 90 is utilized to move the slider 26 toward the cutter assembly 12 (toward the left as viewed in FIG. 5). In addition, the slider 26 is coupled to a constant force spring 92 which is arranged to move the slider 26 away from the cutter assembly 12 (to the right as viewed in FIG. 5). Reciprocably movement of the slider 26 is maintained by having the slider 26 engage straight rails 94.

In addition to the foregoing elements, the inventive apparatus further includes a heater 96 which is on the side of the cutter assembly 12 opposite the retainer assembly 10. The heater 96 has an elongated internal cavity (not shown) for receiving an end of an optical fiber therein and applying heat to the outer protective layer of the fiber. In addition, an air jet 98 communicates with the internal cavity of the heater 96 and is utilized to blow out the cavity after the length of outer protective layer is removed from the fiber.

In operation, when it is desired to remove a length of outer protective layer from an optical fiber, initially the cutter holder block 52 is rotated (indexed) about the axis 53 until the appropriate combination of blade subassembly 36, fiber locator 72 and stop 74 is positioned in alignment with the retainer assembly 10. Illustratively, this is the lowest position on the cutter holder block 52. This provides an appropriate combination of fiber diameter and length of outer protective layer to be removed. The fiber 30 is then loaded into the retainer assembly 10 by locating the tip of the fiber 30 against the forward wall 100 of the fiber guide channel 84 of the stop 74. The fiber 30 is then dropped to the bottom of the fiber guide channel 84 and placed in the groove 24 of the base 18 of the retainer assembly 10. The cover 26 is then installed so that the fiber 30 is securely retained. The air cylinder 90 is then caused to push the slider 26 forward until it engages the rear wall 102 of the stop 74. During this motion, the end of the fiber 30 passes through the bore 80 of the fiber locator, between the cutting edges 48, 50 of the blade subassembly 36, and into the internal cavity of the heater 96. The dimensions of the various elements are chosen so that the fiber is actually moved past the cutting edges 48, 50 and into the heater 96 by a distance equal to the distance between the cutting edges 48, 50 and the heater 96, in order to insure that all of the length of outer protective layer to be removed is within the heater 96. Power is then applied to the heater 96 when it is the primary coating which is to be removed. Heat does not have to be applied if the secondary coating is being removed.

The fiber 30 is then retracted to the cutting position where the cutting edges 48, 50 are the desired distance from the end of the fiber 30. This can be accomplished either by the air cylinder 90 or by a linkage (not shown) coupled to the pistons of the actuators 16, 17 (also preferably air cylinders). Next, the actuators 16, 17 are caused to move the blade holder blocks 38, 40 toward each other. Because of the recesses 68, 70 and the cylindrical tip 78 of the fiber locator 72, the cutting edges 48, 50 are centered on the fiber 30. Therefore, the cutting edges 48, 50 cut through the outer protective layer of the fiber 30 without damaging the optical fiber itself. The air cylinder 90 is then released and the constant force spring 92 pulls the slider 26 away from the cutter assembly 12. Since the cutting edges 48, 50 are still in place, the fiber is pulled out from within the outer protective layer. The actuators 16, 17 are then released and the spring 42 of the blade subassembly 36 separates the cutting edges 48, 50. The air jet 98 then cleans out the removed length of protective layer from the heater 96, as well as any debris remaining on the blades 44, 46.

Accordingly, there has been disclosed improved apparatus for baring an end of a sheathed optical fiber. This improved apparatus eliminates variability in the length of time heat is applied and the pull force applied to the removed length of coating, and may be readily automated. While an exemplary embodiment of the present invention has been disclosed herein, it is understood that various modifications and adaptations to the disclosed embodiment will be apparent to those of ordinary skill in the art and it is intended that this invention be limited only by the scope of the appended claims. Thus, for example, while a pair of actuators 16, 17 have been shown for moving the blades, a single actuator and associated linkage could be substituted for the pair of actuators.

What is claimed is:

1. Apparatus for removing a length of an outer protective layer from an end of an optical fiber, comprising:
    a retainer for the optical fiber, said retainer being movable reciprocably along a line, said retainer being arranged to firmly hold said fiber and its outer protective layer beyond said length from said end with the longitudinal axis of said fiber lying parallel to said line;
    a cutter including a pair of blades, said pair of blades being generally planar and both lying in a plane orthogonal to said line, each blade of said pair of blades being movable in said plane toward and away from the other blade of said pair of blades, each blade of said pair of blades having a concave semi-circular cutting edge aligned so that when said blades are moved into contact with each other there is formed a circular opening defined by the pair of concave semi-circular cutting edges, said circular opening having a diameter substantially equal to the inner diameter of said outer protective layer, said circular opening being centered on the longitudinal axis of said fiber when said fiber is held by said retainer;
    a first actuator for moving said retainer along said line; and
    a second actuator for moving said pair of blades toward each other;
    wherein when the optical fiber is held by said retainer, said first actuator is effective to move said retainer in a first direction so that the end of said fiber passes beyond said pair of blades by a distance equal to said length, said second actuator is then effective to move said pair of blades into contact with each other so that said pair of cutting edges cut through the outer protective layer of said fiber, and said first actuator is then effective to move said retainer in a second direction opposite said first direction so that said length of said outer protective layer is removed from said fiber.

2. The apparatus according to claim 1 wherein said second actuator comprises a pair of actuators each associated with a respective one of said pair of blades.

3. The apparatus according to claim 1 further including:
    a heater adjacent said cutter and on the side of said cutter opposite said retainer, said heater having an elongated cavity for receiving and heating said length of said outer protective layer.

4. The apparatus according to claim 3 further including:
    an air jet associated with said heater cavity and effective to blow out from said heater cavity the removed length of said outer protective layer.

5. The apparatus according to claim 1 wherein said first actuator includes a constant force spring coupled to said retainer to move said retainer away from said cutter;
    whereby a constant force is used to remove said length of said outer protective layer from said fiber.

6. The apparatus according to claim 1 wherein said retainer includes:
    a base having a generally planar support surface with an elongated groove formed in said surface, said groove extending parallel to said line and adapted to receive said optical fiber with said optical fiber extending above said support surface; and
    a cover adapted to be secured to said base over said support surface, said cover having a layer formed of a compliant material which extends across said groove and engages said support surface when said cover is secured to said base, said compliant layer further engaging a fiber received in said groove.

7. The apparatus according to claim 6 wherein said groove is V-shaped when viewed in a plane orthogonal to said line.

8. The apparatus according to claim 1 wherein said cutter includes:
    a pair of blade holders each holding a respective one of said blades with its cutting edge exposed; and
    a spring joining said pair of blade holders and arranged to yieldably bias said pair of blade holders away from each other.

9. The apparatus according to claim 8 further comprising a holder for said cutter, said cutter holder including:

a cutter holder block having a bore therethrough aligned with the longitudinal axis of said fiber when said fiber is held by said retainer; and a cutter receiving member on the side of said cutter holder block opposite said retainer, said cutter receiving member having a cavity for receiving said cutter with said blade cutting edges aligned with said cutter holder block bore.

10. The apparatus according to claim 9 wherein each of said blade holders includes a block formed with a recess on the side facing the cutter holder block bore when the cutter is received in the cutter receiving member cavity, each recess being defined by an arcuate wall concentric with the respective semi-circular cutting edge and of equal radius with the other recess arcuate wall, the apparatus further including:

a fiber locator secured to said cutter holder block and extending through said cutter holder block bore, said fiber locator having a cylindrical tip extending out of said bore toward said cutter receiving member a sufficient distance to engage said blade holder blocks, said cylindrical tip having a radius substantially equal to the radius of each recess arcuate wall, said fiber locator being further formed with a central longitudinal circular bore therethrough centered along the longitudinal axis of said fiber when said fiber is held by said retainer, and in there region where said cylindrical tip extends out of said cutter holder block bore said fiber locator bore having a diameter sufficient to allow said fiber with said outer protective layer to pass therethrough;

whereby when said pair of blades are moved toward each other both of said pair of blade cutting edges are centered on said fiber due to said pair of recess arcuate walls engaging the cylindrical tip of said fiber locator.

11. The apparatus according to claim 10 further including a stop positioned between said cutter and said retainer and arranged to limit movement of said retainer toward said cutter, said stop being secured to said fiber locator and including a fiber guide channel adjacent said fiber locator bore;

whereby when a fiber is placed in said retainer with its end at a predetermined location in said fiber guide channel of said stop, subsequent movement of said first actuator in said first direction until said retainer engages said stop will cause the end of said fiber to pass through said fiber locator bore and beyond said pair of blades a distance equal to said length.

12. The apparatus according to claim 11 wherein said cutter holder block includes a plurality of bores and there is associated with each of said plurality of cutter holder block bores a respective set of a cutter receiving member, a cutter, a fiber locator and a stop, and wherein said cutter holder block is selectively indexable to align a selected one of said plurality of cutter holder block bores with the longitudinal axis of a fiber held by said retainer;

whereby said apparatus accommodates fibers of differing sizes which require the removal of differing lengths of outer protective layer.

* * * * *